US008514431B2

(12) United States Patent  
Thieret et al.

(10) Patent No.: US 8,514,431 B2  
(45) Date of Patent: Aug. 20, 2013

(54) METHOD AND APPARATUS FOR AUTOMATED CALL ASSISTANCE FOR MALFUNCTIONS IN AN IMAGE PRODUCTION DEVICE

(75) Inventors: Tracy E. Thieret, Webster, NY (US); Robert A. Gunther, Webster, NY (US); Frederic Roulland, Le Versoud (FR)

(73) Assignee: Xerox Corporation, Norwalk, CT (US)

( * ) Notice: Subject to any disclaimer, the term of this patent is extended or adjusted under 35 U.S.C. 154(b) by 686 days.

(21) Appl. No.: 12/334,931

(22) Filed: Dec. 15, 2008

(65) Prior Publication Data

US 2010/0149571 A1    Jun. 17, 2010

(51) Int. Cl.
*G06F 11/00* (2006.01)
*G06F 3/12* (2006.01)

(52) U.S. Cl.
USPC ......... 358/1.15; 358/1.13; 358/1.1; 358/1.14; 358/406; 358/504; 714/46; 714/44

(58) Field of Classification Search
CPC .... G03G 15/5016; G03G 15/55; G06Q 10/00
USPC .................. 714/30, 31, 37, 100, 44, 46, 1, 2, 714/4.3, 4.4, 49–57; 358/1.11–1.18, 406; 709/206, 224; 399/8–37
See application file for complete search history.

(56) References Cited

U.S. PATENT DOCUMENTS

| 5,394,458 | A  | * | 2/1995  | Allen et al. ............... 379/9.06 |
| 5,694,528 | A  | * | 12/1997 | Hube ........................... 358/1.14 |
| 6,029,258 | A  | * | 2/2000  | Ahmad ........................... 714/46 |
| 6,665,085 | B1 | * | 12/2003 | Edmunds et al. ............ 358/1.15 |
| 2002/0152430 | A1 | * | 10/2002 | Akasaka et al. ............... 714/43 |
| 2003/0020942 | A1 | * | 1/2003  | Teres ........................... 358/1.14 |
| 2004/0260704 | A1 | * | 12/2004 | Moore .......................... 707/100 |
| 2005/0097405 | A1 | * | 5/2005  | Sesek et al. .................... 714/48 |
| 2006/0078859 | A1 | * | 4/2006  | Mullin ......................... 434/219 |
| 2006/0197973 | A1 | * | 9/2006  | Castellani et al. ............ 358/1.14 |
| 2006/0256367 | A1 | * | 11/2006 | Wei .............................. 358/1.15 |
| 2007/0220365 | A1 | * | 9/2007  | Castellani et al. ............. 714/46 |

FOREIGN PATENT DOCUMENTS

EP    1109101 A2    6/2001
EP    1505769 A2    2/2005

* cited by examiner

*Primary Examiner* — Chad Dickerson
(74) *Attorney, Agent, or Firm* — Ronald E. Prass, Jr.; Prass LLP

(57) ABSTRACT

A method for automated call assistance for malfunctions in an image production device may include receiving a signal from a user interface requesting call assistance, transmitting the call assistance request to an automated call assistance processing unit along with customer and image production device identification information, receiving a signal from the automated call assistance processing unit to identify one or more malfunctions, identifying one or more malfunctions, transmitting the one of more identified malfunctions to the automated call assistance processing unit, receiving a signal from the automated call assistance processing unit to perform one or more diagnostic tests on the image production device, performing the one or more diagnostic tests, transmitting the results of the one or more diagnostic tests to at least one of the user interface and the automated call assistance processing unit, receiving instructions from the automated call assistance processing unit concerning one or more remedies for the one or more malfunctions, and implementing the received instructions concerning one or more remedies.

20 Claims, 5 Drawing Sheets

METHOD AND APPARATUS FOR AUTOMATED CALL ASSISTANCE FOR MALFUNCTIONS IN AN IMAGE PRODUCTION DEVICE

BACKGROUND

Disclosed herein are a method and apparatus for automated call assistance for malfunctions in an image production device.

In conventional image production devices, users have a set of resources for addressing reduced device functionality. The first resource dictates that the user read and follow the instructions on the device user interface in response to a fault or status message. The second resource involves the user using an internet-based website and performing a short diagnostic session with an application hosted thereon. The third involves the user calling an assistance center from an office telephone.

In each case the user must enter data or respond to questions that the machine could answer if the capability to supply the information was enabled and connected to the call. Typically, the user answers these questions repeatedly for different service provider levels as the call is escalated to more expensive human resources. Also, even if the user is inclined to assist in solving the problem, there is not always a sufficient venue for providing extended assistance to customers as they proceed.

SUMMARY

A method and apparatus for automated call assistance for malfunctions in an image production device is disclosed. The method may include receiving a signal from a user interface requesting call assistance, transmitting the call assistance request to an automated call assistance processing unit along with customer and image production device identification information, receiving a signal from the automated call assistance processing unit to identify one or more malfunctions in the image production device, identifying one or more malfunctions, sending a prompt to the user to confirm the one or more identified malfunctions, determining if a confirmation from the user has been received, wherein if it is determined that a confirmation from the user has been received, transmitting the one of more identified malfunctions to the automated call assistance processing unit, receiving a signal from the automated call assistance processing unit to perform one or more diagnostic tests on the image production device, performing the one or more diagnostic tests, transmitting the results of the one or more diagnostic tests to at least one of the user interface and the automated call assistance processing unit, receiving instructions from the automated call assistance processing unit concerning one or more remedies for the one or more malfunctions, and implementing the received instructions concerning one or more remedies for the one or more malfunctions.

DETAILED DESCRIPTION

Figure 1:
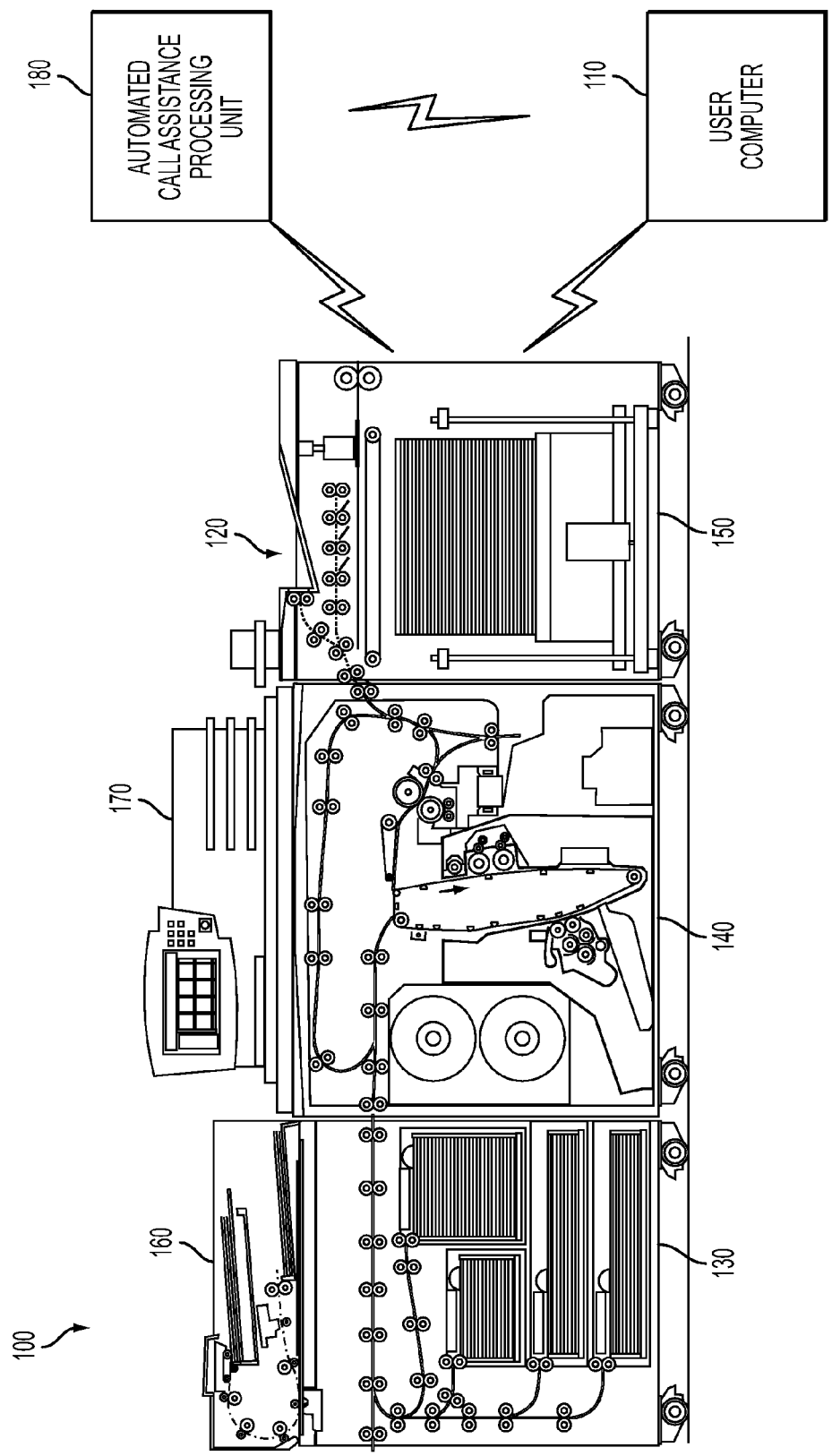
FIG. 1 is an exemplary diagram of an image production environment in accordance with one possible embodiment of the disclosure.

Aspects of the embodiments disclosed herein relate to a method and apparatus for automated call assistance for malfunctions in an image production device.

The disclosed embodiments may include a method for automated call assistance for malfunctions in an image production device. The method may include receiving a signal from a user interface requesting automated call assistance, transmitting the call assistance request to an automated call assistance processing unit along with customer and image production device identification information, receiving a signal from the automated call assistance processing unit to identify one or more malfunctions in the image production device, identifying one or more malfunctions, sending a prompt to the user to confirm the one or more identified malfunctions, determining if a confirmation from the user has been received, wherein if it is determined that a confirmation from the user has been received, transmitting the one of more identified malfunctions to the automated call assistance processing unit, receiving a signal from the automated call assistance processing unit to perform one or more diagnostic tests on the image production device, performing the one or more diagnostic tests, transmitting the results of the one or more diagnostic tests to at least one of the user interface and the automated call assistance processing unit, receiving instructions from the automated call assistance processing unit concerning one or more remedies for the one or more malfunctions, and implementing the received instructions concerning one or more remedies for the one or more malfunctions.

The disclosed embodiments may further include an image production device that may include a communication interface that facilitates transmission and reception of communications to and from the image production device, a user interface that receives a signal from a user interface requesting automated call assistance, and a call assistance module that transmits the call assistance request through the communication interface to an automated call assistance processing unit along with customer and image production device identification information, receives a signal from the automated call assistance processing unit through the communication interface to identify one or more malfunctions in the image production device, identifies one or more malfunctions, sends a prompt to the user at the user interface to confirm the one or more identified malfunctions, determines if a confirmation from the user has been received, wherein if it is determined that a confirmation from the user has been received, transmits the one of more identified malfunctions to the automated call assistance processing unit through the communication interface, receives a signal from the automated call assistance processing unit through the communication interface to perform one or more diagnostic tests on the image production device, performs the one or more diagnostic tests, transmits the results of the one or more diagnostic tests through the communication interface to at least one of the user interface and the automated call assistance processing unit, receives instructions from the automated call assistance processing unit through the communication interface concerning one or more remedies for the one or more malfunctions, and implements the received instructions concerning one or more remedies for the one or more malfunctions.

The disclosed embodiments may further include a method for providing automated call assistance for malfunctions in an image production device. The method may include receiving a call assistance request from an image production device along with customer and image production device identification information, transmitting a request to the image production device to identify one or more malfunctions, receiving one of more identified malfunctions from the image production device, identifying one or more diagnostic tests based on the received one of more identified malfunctions, transmitting a message to the image production device for the user to perform the identified one or more diagnostic tests, receiving the results of the one or more diagnostic tests from the image production device, identifying one or more remedies for the one or more malfunctions based on the results of the one or more diagnostic tests, and transmitting instructions concerning the one or more remedies for the one or more malfunctions to the image production device.

The disclosed embodiments may concern call assistance in an image production device. This process may place all the computational resources (i.e., rules, knowledgebase, diagnostics, remote solution personnel, etc.) at the point of least cost to the manufacturer or third-party maintenance service provider. This process may also enable the user to enter an event into the service delivery data streams directly without having to call the assistance center or engage the website.

The user request may summarize the problem and provide raw data about the machine to uniquely identify the device and the customer. The initial response from an automated call assistance processing unit may provide suggestions about procedures to attempt based on the data received from the machine. The process may also to provide back office automated analysis systems with information concerning what the problems the machine is experiencing in the event the problems are escalated. Thus, this process may provide the ability to utilize all possible resources along the least expensive solution path (i.e., the user at the user interface of the device).

The disclosed embodiments may provide the following functionality:

A push button may be located on the user interface that automatically connects to the back office service resources via a remote connection. Then, the user may be taken to the appropriate web page for the particular device in question and notify a knowledgebase and back office rules engine which work together in:

Transmitting the customer and the machine identity information without the user entering any of that data. This function may be followed with a data push prompting a decision support engine process for determining the machine problem set, for example.

Determining the level of service to which the customer is entitled by consultation with the contract administrators available in a back office database.

Identifying the particular problem that the machine is experiencing and acknowledging to the customer that a problem exists, and the identification (or confirmation) of such a problem.

Conducting a remote diagnostics session with the image production device to narrow the list of possible problems. This process may involve running an automated program in dialog with the device and determining the problem/solution or suggesting a test that the user may perform in order to proceed toward finding the problem and its solution.

Providing a solution set for the user to attempt or to notify a service department of the need for a customer service engineer (CSE) visit in the event that the customer cannot (or will not) perform the next diagnostic test.

Suggesting a telephone connection to a skilled human resource for additional verbal assistance.

Providing an annotated record for field service of the state of the repair and in the event that a CSE is dispatched, a service log indicating what assessments were done by the image production device, the back office systems, and the user during the process of fixing the problem.

Providing a "check mark" to field service cost reporting functions to indicate that the call was handled or service time reduced by the execution of this process. This process may also provide a dynamic pricing opportunity for field service maintenance agreement customers. Those who participate could receive a per-use reduction in their maintenance agreement as an incentive, for example.

A push button located on the user interface (such as "Request Assistance"), when pressed, may automatically contact a back office system via a remote connection and populates a service case file. The process may run the above set of activities with the exception of "providing a solution set" and "suggesting a telephone connection" because the user may be disinterested in pursuing remediation of the problem on his or her own accord. Upon review of the case, a CSE may be dispatched.

At the device's web page, the user may press a call assistance button on the page. Again, all the above activities may occur with the exception of the "providing a solution set" and "suggesting a telephone connection" steps.

A push button may be provided that could be pressed at any client and place a basic call to a service choice. For example, a user may bring up a browser based tool on a generic personal computer and type in the basic information to enter a case into the service delivery system.

Advantages of the disclosed embodiments may include:

Reduced on-site visits by field engineers, engineering personnel, etc. by providing as much assistance as possible at the point of least cost to the manufacturer/service provider to get the customer's machine problem resolved.

Immediate access to service back office support personnel at the time and place where the failure is detected.

Real data may be utilized in the escalation path—the most relevant, time sensitive data may be captured at the exact point of the failure for analysis.

No need to call the manufacturer/service provider for everything. Users do not need to dial in to a service center. The user may be taken directly to the appropriate resource on the Internet for the problem they are experiencing at the time and location where they are having the problem.

Fact Based Customer Support—logs may be maintained for every customer contact and forwarded to the next echelon so they do not have to obtain the same information again from the user (which may cause user dissatisfaction with the manufacturer/service provider).

Increase in the use of technology may increase customer satisfaction and confidence.

Isolation of diagnostics to entitled users and restriction of back office computational assistance to authorized parties only.

Provides tiers of diagnostic functionality that may leverage the expertise/willingness of the human participant be they a user or CSE. Willing or more experienced users may get more help than less experienced/willing ones.

A dynamic pricing opportunity to modulate the customer's maintenance agreement contract payment to respond to their actual use of expensive resources. Engage a mechanism for scaling the cost to the customer to the cost to the manufacturer/service provider.

There may also be levels of customer/user involvement possible. In each instance, the back office decision support systems may receive the best data available and this process may put the maximum assistance to the customer at the point of least cost to the manufacturer/service provider:

Hands off—customer starts the service process and goes away with some guaranteed response time from the back office systems as to what the next steps are going follow. The computational analysis may occur with the most relevant data set and the results may be packaged for the next service echelon level.

Internet service level—Customer starts the service process but then engages in a dialog with a knowledge base to try to identify the problem with the machine and proposed solutions.

Full participation—Customer starts the service process and continues until either the problem is resolved or until a CSE is required to perform further repair actions. This process may include the assistance of a skilled human resource to direct the customer through procedures.

In each case the information and any actions taken by the customer may be captured and kept in a service call log. In a fully integrated system, this call log may follow the call until the issue is resolved. All information about the call may be captured within and made available to each successive service echelon during the escalation process.

FIG. 1 is an exemplary diagram of an image production environment 100 in accordance with one possible embodiment of the disclosure. The image production environment 100 may include a processing device 110 that may be hardwired or Tirelessly connected to an image production device 120.

The processing device 110 may be any device that communicates with the image production device 120, including a computer, a server, a telephone, or a personal digital assistant, for example. The image production device 120 may be any device that may be capable of printing documents, including a printer, a copier/printer, an office copier/printer, a high-capacity copier/printer, a commercial copier/printer, a facsimile/printer device, or a multi-function device, for example.

The automated call assistance processing unit 180 may represent one or more remote processing device (e.g., computer, server, etc.) at any remote facility where messages may be sent via a communications network to an image production device, maintainer, technician, operator, etc. Messages may be sent from the image production device 120 or a processing device 110 communicating with the image production device 120 to a computer at the automated call assistance processing unit 180 via the Internet, through e-mail, or other messaging software, for example, so that the messages automatically processed. The automated call assistance processing unit 180 may be located in the same facility as human technicians or may be located in an entirely different facility. In any event, the automated call assistance processing unit 180 may provide assistance to image production device users independent from any human operation and intervention.

The image production device 120 may include an image production section 140, which includes hardware by which image signals are used to create a desired image, as well as a feeder section 130, which stores and dispenses sheets on which images are to be printed, and an output section 150, which may include hardware for stacking, folding, stapling, binding, etc., prints which are output from the marking engine. If the printer is also operable as a copier, the printer further includes a document feeder 160, which operates to convert signals from light reflected from original hard-copy image into digital signals, which are in turn processed to create copies with the image production section 140. The image production device 120 may also include a local user interface 170 for controlling its operations, although another source of image data and instructions may include any number of computers to which the printer is connected via a network.

With reference to feeder section 130, the module stores stacks of media and includes a feeder to dispense one of the sheets therein as instructed. Sheets of media drawn from the media stack may then be moved to the image production section 140 to receive one or more images thereon. Then, the printed sheet is then moved to output section 150, where it may be collated, stapled, folded, etc., with other media sheets in manners familiar in the art.

Figure 2:
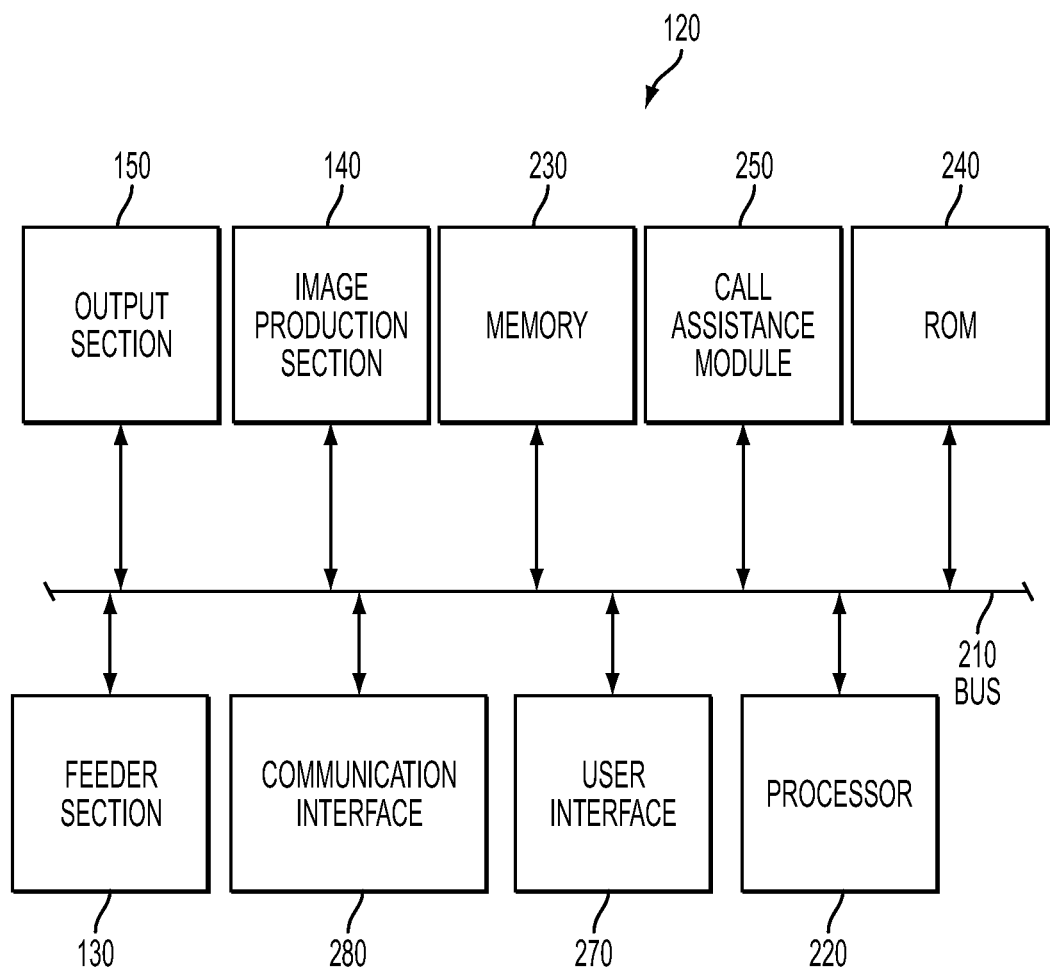
FIG. 2 is an exemplary block diagram of an image production device in accordance with one possible embodiment of the disclosure.

FIG. 2 is an exemplary block diagram of an image production device 120 in accordance with one possible embodiment of the disclosure. The image production device 120 may include a bus 210, a processor 220, a memory 230, a read only memory (ROM) 240, a call assistance module 250, a user interface 270, a communication interface 280, the feeder section 130, the image production section 140, and the output section 150. Bus 210 may permit communication among the components of the image production device 120.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 270 may include one or more conventional mechanisms that permit a user to input information to and interact with the image production unit 100, such as a keyboard, a display, a mouse, a pen, a voice recognition device, touchpad, buttons, etc., for example. The feeder section 130, the image production section 140, and the output section 150 were discussed above in relation to FIG. 1.

The image production device 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

Figure 3:
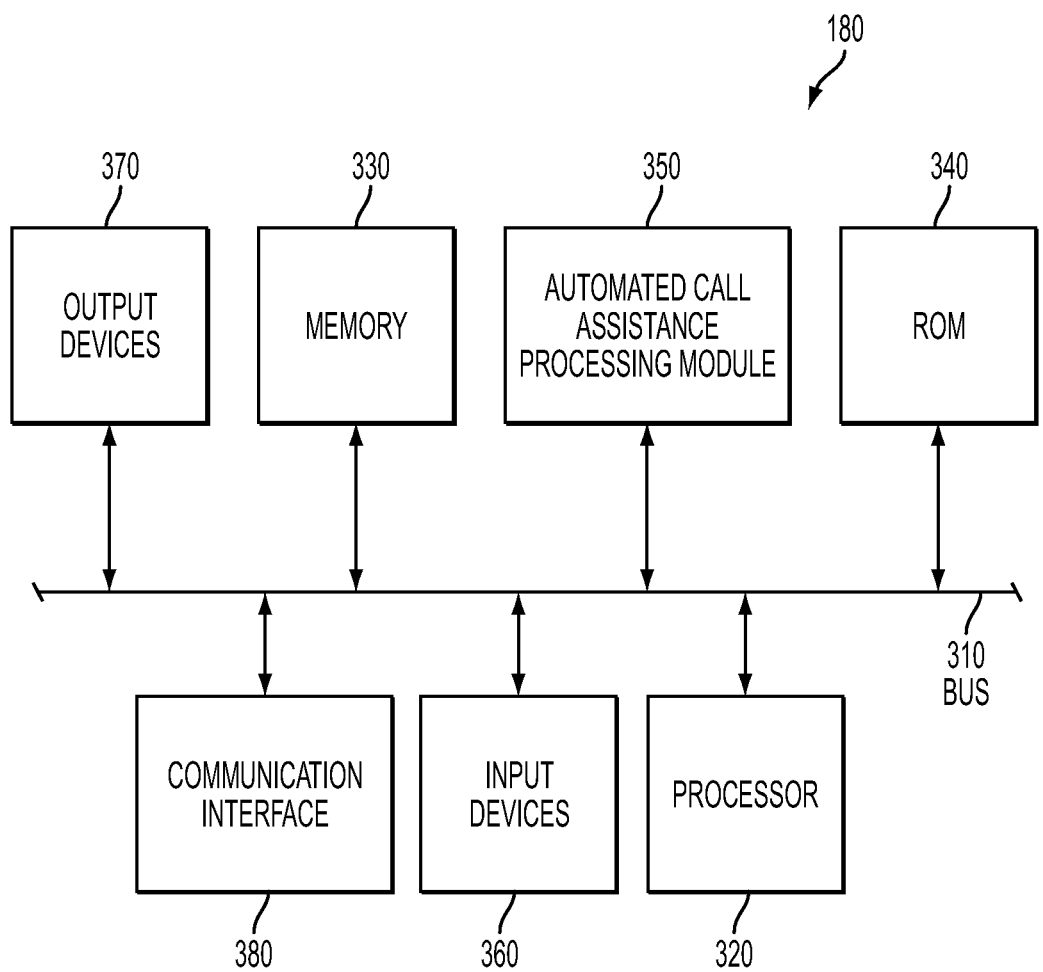
FIG. 3 is an exemplary block diagram of an automated call assistance processing unit in accordance with one possible embodiment of the disclosure.

FIG. 3 is an exemplary block diagram of an automated call assistance processing unit 180 in accordance with one possible embodiment of the disclosure. The automated call assistance processing unit 180 may include a bus 310, a processor 320, a memory 330, ROM 340, an automated call assistance processing module 350, input devices 360, output devices 370, and a communication interface 380. Bus 310 may permit communication among the components of the automated call assistance processing unit 180.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by the processor 320. Memory 330 may also include any type of media, such as, for example, magnetic or optical recording media and its corresponding drive. ROM 340 may include a conventional ROM device or another type of static storage device that stores static information and instructions for the processor 320.

Input devices 360 may include one or more conventional mechanisms that permit a user to input information to the automated call processing unit 180, such as a keyboard, a mouse, a pen, a voice recognition device, etc. Output devices 370 may include one or more conventional mechanisms that output information to the user, including a printer, one or more speakers, or a medium, such as a memory, or a magnetic or optical disk and a corresponding disk drive.

Communication interface 380 may include any transceiver-like mechanism that enables the automated call processing unit 180 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. In some implementations of automated call assistance processing unit 180, communication interface 380 may not be included in the exemplary the automated call assistance processing unit 180 when the automated call assistance process is implemented completely within the automated call assistance processing unit 180.

The automated call assistance processing unit 180 may perform such functions in response to processor 320 by executing sequences of instructions contained in a computer-readable medium, such as, for example, memory 330, a magnetic disk, or an optical disk. Such instructions may be read into memory 330 from another computer-readable medium, or from a separate device via communication interface 380.

The automated call assistance processing unit 180 illustrated in FIGS. 1 and 3 and the image production device 120 illustrated in FIGS. 1 and 2 and the related discussion are intended to provide a brief, general description of a suitable computing environment in which the disclosure may be implemented. Although not required, the disclosure will be described, at least in part, in the general context of computer-executable instructions, such as program modules, being executed by the automated call assistance processing unit 180 or the image production device 120, such as a general purpose computer.

Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like.

Figure 4:
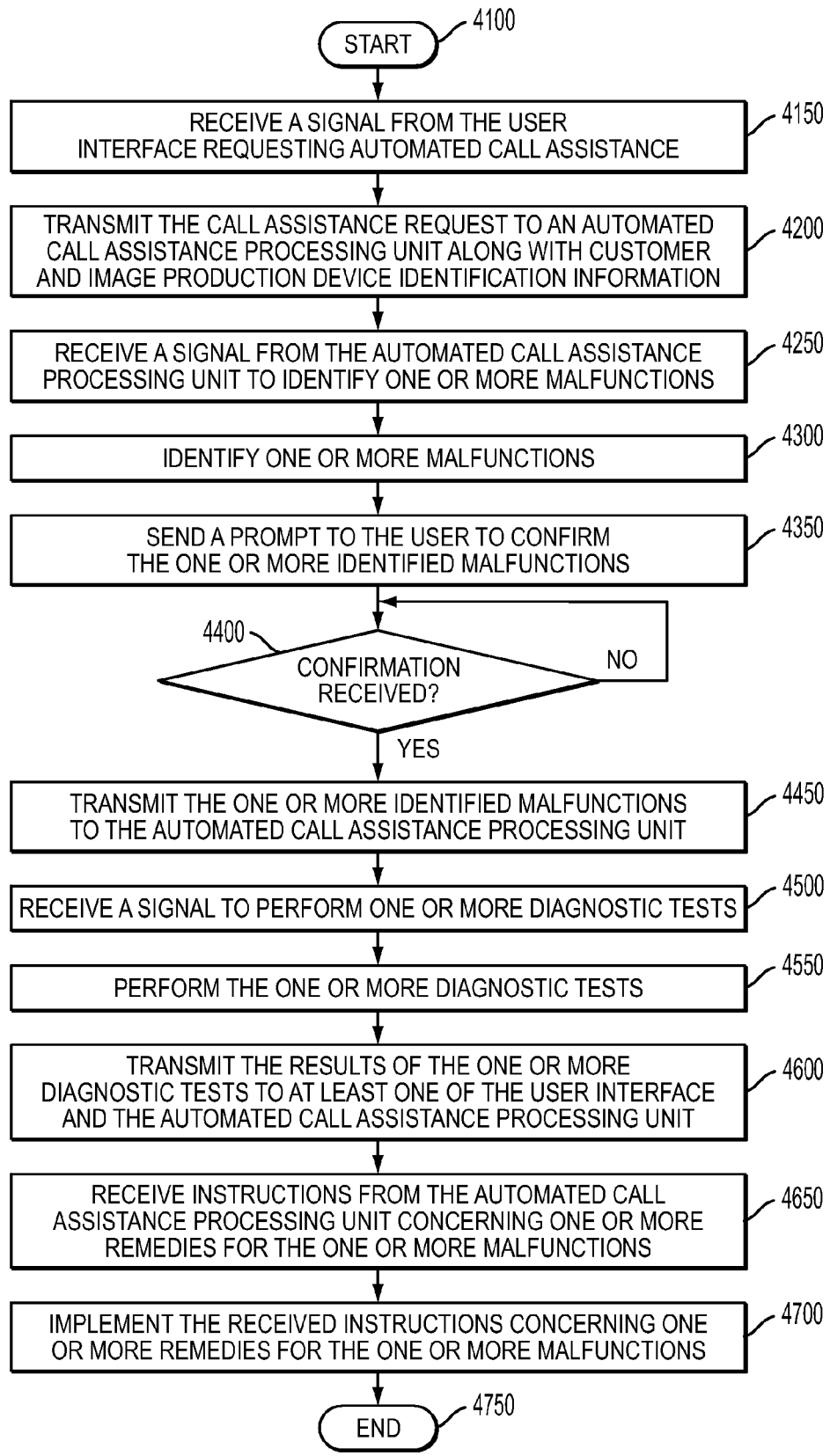
FIG. 4 is a flowchart of an exemplary automated call assistance process in accordance with one possible embodiment of the disclosure.
Figure 5:
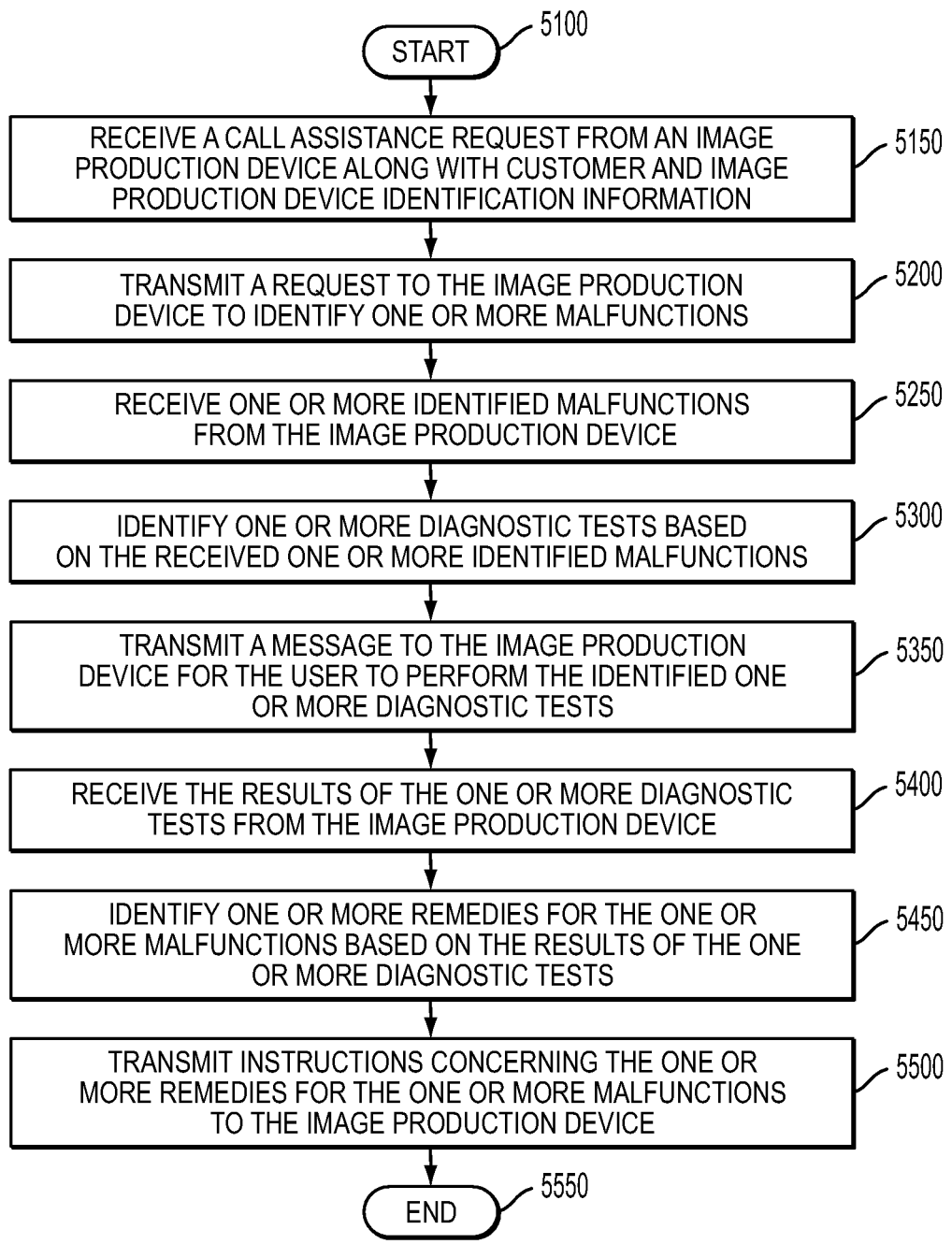
FIG. 5 is a flowchart of an exemplary automated call assistance processing process in accordance with one possible embodiment of the disclosure.

For illustrative purposes, the operation of the call assistance module 250 and the exemplary call assistance process are described in FIG. 4 in relation to the diagrams shown in FIGS. 1-2 and the operation of the automated call assistance processing module 350 and the exemplary call assistance process are described in FIG. 5 in relation to the diagrams shown in FIGS. 1 and 3.

FIG. 4 is a flowchart of an exemplary call assistance process in accordance with one possible embodiment of the disclosure. The process may begin at step 4100, and continues to step 4150 where the user interface 170 may receive a signal from the user interface 170 requesting call assistance. The user may be prompted by the user interface 170 or may select a call assistance screen from a menu, for example. The user may then click on or select a "call assistance" button, for example. At step 4200, the call assistance module 250 may transmit the call assistance request through the communication interface 280 to an automated call assistance processing unit 180 along with customer and image production device 120 identification information. The image production device 120 identification information may include model type identification, serial number, features and option identification, etc., for example.

At step 4250, the call assistance module 250 may receive a signal from the automated call assistance processing unit 180 through the communication interface 280 to identify one or more malfunctions in the image production device 120. At step 4300, the call assistance module 250 may identify the one or more malfunctions. In addition, the user may be prompted to insert a description or further comments. At step 4350, the call assistance module 250 may send a prompt to the user at the user interface 170 to confirm the one or more identified malfunctions. In this manner, the user may be prompted to click on a button for confirmation or click on a button that indicated that one or more of the identified malfunctions are incorrect. The user may then have to provide feedback on the screen provided at the user interface 170.

At step 4400, the call assistance module 250 may determine if a confirmation from the user has been received. If the call assistance module 250 determines that a confirmation from the user has not been received, the process returns to step 4400. If at step 4400, the call assistance module 250 determines that a confirmation from the user has been received, then at step 4450, the call assistance module 250 may transmit the one or more identified malfunctions to the automated call assistance processing unit through the communication interface 280.

At step 4500, the call assistance module 250 may receive a signal from the automated call assistance processing unit 180 through the communication interface 280 to perform one or more diagnostic tests on the image production device 120. The diagnostic tests may be any known or future tests that may be run on an image production device 120 to identify a malfunction. At step 4550, the call assistance module 250 may perform the one or more diagnostic tests. At step 4600, the call assistance module 250 may transmit the results of the one or more diagnostic tests through the communication interface 280 to at least one of the user interface 170 and the automated call assistance processing unit 180.

At step 4650, the call assistance module 250 may receive instructions from the automated call assistance processing unit 180 through the communication interface 280 concerning one or more remedies for the one or more malfunctions. However, if the malfunction is such that major repairs are required, a message indicating such will be displayed to the user and the automated call assistance processing unit 180 may make arrangements for a higher-level repair strategy, such as having a technician dispatched or scheduled, shipping the image production device 120 to a repair facility, etc. In addition, the instructions may be received via the Internet or the telephone, for example. The instructions may also be received at remote location or on another device, such a laptop computer or a personal computer, for example.

At step 4700, the call assistance module 250 may implement the received instructions concerning one or more remedies for the one or more malfunctions. The process may then go to step 4800, and end.

The call assistance module 250 may create a log concerning the user's request to the automated call assistance processing unit 180. The log may include at least a call assistance case number, a record of transmitted and received messages between the automated call assistance processing unit and the user, or other information concerning the request, for example.

The call assistance module 250 may also prompt the user at the user interface 170 to indicate that the malfunction was resolved by implementing one or more of the received instructions. The malfunction and the implemented instruction that solved the malfunction may be stored in a memory 230 or storage device at the automated call assistance processing unit 180, for future use, for example.

FIG. 5 is a flowchart of an exemplary automated call assistance processing process in accordance with one possible embodiment of the disclosure. The process begins at step 5100 and continues to step 5150 where the automated call assistance processing module 350 may receive a call assistance request from an image production device 120 along with customer and image production device identification information. At step 5200, the automated call assistance processing module 350 may transmit a request to the image production device 120 to identify one or more malfunctions.

At step 5250, the automated call assistance processing module 350 may receive one of more identified malfunctions from the image production device 120. At step 5300, the automated call assistance processing module 350 may identify one or more diagnostic tests based on the received one of more identified malfunctions.

At step 5350, the automated call assistance processing module 350 may transmit a message to the image production device 120 for the user to perform the identified one or more diagnostic tests. At step 5400, the automated call assistance processing module 350 may receive the results of the one or more diagnostic tests from the image production device 120.

At step 5450, the automated call assistance processing module 350 may identify one or more remedies for the one or more malfunctions based on the results of the one or more diagnostic tests. At step 5500, the automated call assistance processing module 350 may transmit instructions concerning the one or more remedies for the one or more malfunctions to the image production device 120. The process may then go to step 5550 and end.

Note that this process is performed by a remotely located computer, server, etc. without the aid of human intervention. If the automated call assistance processing unit 180 cannot resolve the malfunction, the automated call assistance processing module 350 may receive an indication from the image production device 120 that the one or more remedies did not solve the one or more malfunctions and may send a message to a human customer service technician so that he or she may be called, contact the user, or be dispatched for a customer visit.

The automated call assistance processing module 350 may create a log entry concerning the one or malfunction of the image production device 120. The log entry may include the identification of the image production device 120, the received malfunctions, the remedies transmitted, and whether one or more of the remedies resolved the malfunctions.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automated call assistance for malfunctions in an image production device, comprising:
   receiving a signal from a user interface requesting automated call assistance;
   transmitting the call assistance request to an automated call assistance processing unit along with customer and image production device identification information;
   receiving a signal from the automated call assistance processing unit to identify one or more malfunctions in the image production device, the signal being sent from the automated call assistance processing unit to a call assistance module of the image production device, after and in response to the call assistance request;

identifying one or more malfunctions, the identifying being performed by the call assistance module in response to the signal to identify one or more malfunctions received from the automated call assistance processing unit;

sending a prompt to a user to confirm the one or more identified malfunctions;

determining if the confirmation of the one or more identified malfunctions from the user has been received, wherein if it is determined that the confirmation of the one or more identified malfunction from the user has been received, transmitting the one of more identified malfunctions to the automated call assistance processing unit after the determining if the confirmation of the one or more identified malfunctions has been received;

receiving a signal from the automated call assistance processing unit to perform one or more diagnostic tests on the image production device after the transmitting the one or more identified malfunctions to the automated call assistance processing unit;

performing the one or more diagnostic tests;

transmitting results of the one or more diagnostic tests to at least one of the user interface and the automated call assistance processing unit;

receiving instructions from the automated call assistance processing unit concerning one or more remedies for the one or more malfunctions;

implementing the received instructions concerning one or more remedies for the one or more malfunctions, and providing, by the automated call assistance processing unit, a check mark for field service cost reporting functions indicating reduced service time by the implementing the received instructions concerning one or more remedies for the one or more malfunctions in the image production device.

2. The method of claim 1, wherein the instructions are received via at least one of Internet, a telephone, and a wireless telephone.

3. The method of claim 1, wherein the instructions are received at one of a laptop computer and a personal computer.

4. The method of claim 1, further comprising:
creating a log concerning the call assistance request to the automated call assistance processing unit, wherein the log includes a call assistance case number and a record of transmitted and received messages between the automated call assistance processing unit and the user.

5. The method of claim 1, further comprising:
prompting the user at the user interface to indicate that the malfunction was resolved by implementing one or more of the received instructions concerning the one or more remedies.

6. The method of claim 5, wherein the malfunction and the implemented received instructions concerning the one or more remedies that solved the malfunction are stored for future use.

7. The method of claim 1, wherein the image production device is one of a printer, a copier/printer, an office copier/printer, a high-capacity copier/printer, a commercial copier/printer, a facsimile/printer device, and a multi-function device.

8. An image production device, comprising:
a communication interface that facilitates transmission and reception of communications to and from the image production device;
a user interface that receives a signal from a user requesting automated call assistance; and
a call assistance module that transmits the call assistance request through the communication interface to an automated call assistance processing unit along with customer and image production device identification information, receives a signal from the automated call assistance processing unit through the communication interface to identify one or more malfunctions in the image production device, identifies one or more malfunctions and is configured to identify the one or more malfunctions in response to the signal received from the automated call assistance processing unit, sends a prompt to the user at the user interface to confirm the one or more identified malfunctions, determines if the confirmation of the one or more identified malfunctions from the user has been received, wherein if it is determined that the confirmation of the one or more identified malfunctions from the user has been received, transmits the one of more identified malfunctions to the automated call assistance processing unit through the communication interface after the receiving the signal from the automated call assistance processing unit through the communication interface to identify one or more malfunctions in the image production device, receives a signal from the automated call assistance processing unit through the communication interface to perform one or more diagnostic tests on the image production device after the transmitting the one or more identified malfunctions to the automated call assistance processing unit, performs the one or more diagnostic tests, transmits results of the one or more diagnostic tests through the communication interface to at least one of the user interface and the automated call assistance processing unit, receives instructions from the automated call assistance processing unit through the communication interface concerning one or more remedies for the one or more malfunctions, implements the received instructions concerning one or more remedies for the one or more malfunctions, and provides, with the automated call assistance processing unit, a check mark to field service cost reporting functions to indicate that service time is reduced by the implementing the received instructions concerning one or more remedies for the one or more malfunctions.

9. The image production device of claim 8, wherein the instructions are received via at least one of Internet, a telephone, and a wireless telephone.

10. The image production device of claim 8, wherein the instructions are received at one of a laptop computer and a personal computer.

11. The image production device of claim 8, wherein the call assistance module creates a log concerning the call assistance request to the automated call assistance processing unit, wherein the log includes at least a call assistance case number and a record of transmitted and received messages between the automated call assistance processing unit and the user.

12. The image production device of claim 8, wherein the call assistance module prompts the user at the user interface to indicate that the malfunction was resolved by implementing the one or more of the received instructions.

13. The image production device of claim 12, wherein the malfunction and the implemented one or more received instructions concerning the one or more remedies that solved the malfunction are stored in a memory for future use.

14. The image production device of claim 8, wherein the image production device is one of a printer, a copier/printer, an office copier/printer, a high-capacity copier/printer, a commercial copier/printer, a facsimile/printer device, and a multi-function device.

15. A method for providing automated call assistance for malfunctions in an image production device, comprising
receiving a call assistance request from an image production device along with customer and image production device identification information;
transmitting a request to a call assistance module of the image production device to identify one or more malfunctions;
receiving one or more identified malfunctions from the image production device, at least one of the one or more identified malfunction being identified by the call assistance module of the image production device in response to the call assistance request to the image production device to identify one or more malfunctions;
identifying one or more diagnostic tests based on the received one of more identified malfunctions after the receiving the one or more identified malfunctions from the image production device;
transmitting a message to the image production device for a user to perform the identified one or more diagnostic tests after the identifying the one or more diagnostic test based on the received one or more identified malfunctions;
receiving results of the one or more diagnostic tests from the image production device;
identifying one or more remedies for the one or more malfunctions based on the results of the one or more diagnostic tests;
transmitting instructions concerning the one or more remedies for the one or more malfunctions to the image production device;
prompting the user at the user interface to indicate the malfunction was resolved by implementing the transmitted instructions concerning the one or more remedies;
providing a check mark to field service cost reporting functions to indicate that a service time is reduced by the implementing the transmitted instructions concerning the one or more remedies for the one or more malfunctions in the image production device; and
storing the transmitted instructions concerning the one or more remedies implemented to solve the malfunction and the one or more malfunctions in memory at the automated call assistance processing unit.

16. The method of claim 15, further comprising:
receiving an indication from the image production device that the one or more remedies did not solve the one or malfunctions.

17. The method of claim 16, further comprising:
sending a message to a customer service agent to contact the user of the image production device.

18. The method of claim 15, further comprising:
creating a log entry concerning the call assistance request to the automated call processing unit, wherein the log includes a call assistance case number, and a record of transmitted and received messages between the automated call assistance processing unit.

19. The method of claim 15, wherein the call assistance request is sent from the user interface of the image production device and the method is performed by a remotely located computer.

20. The method of claim 15, wherein the image production device is one of a printer, a copier/printer, an office copier/printer, a high-capacity copier/printer, a commercial copier/printer, a facsimile/printer device, and a multi-function device.

* * * * *